S. FRIEDMAN.

SNOW MELTING MACHINE AND METHOD OF OPERATING SAME.

APPLICATION FILED MAY 31, 1918.

Reissued Nov. 18, 1919. 14,754.

Inventor
Samuel Friedman
by Emerson R. Newell
attorney

UNITED STATES PATENT OFFICE.

SAMUEL FRIEDMAN, OF NEW YORK, N. Y.

SNOW-MELTING MACHINE AND METHOD OF OPERATING SAME.

14,754. Specification of Reissued Letters Patent. Reissued Nov. 18, 1919.

Original No. 999,445, dated August 1, 1911, Serial No. 602,181, filed January 12, 1911. Application for reissue filed May 31, 1918. Serial No. 237,673.

*To all whom it may concern:*

Be it known that I, SAMUEL FRIEDMAN, a citizen of the United States, and a resident of New York, in the county of New York and State of New York, have invented certain new and useful Improvements in Snow-Melting Machines and Methods of Operating Same, of which the following is a specification.

My invention relates to improvements in snow melting machines, and to an improved method of operating said machines, and the objects of the invention are to improve upon the construction of snow melting or snow removing machines and the method of operating the same so that the snow or ice can readily be removed from the streets of cities and converted into a slush which can easily be removed from the machine at a very small expense.

To the accomplishment of the above objects, and to such others as may hereinafter appear, the invention comprises means for feeding snow, ice and the like to a tank which is arranged to receive from another tank water containing a small percentage of salt or similar substance which will convert the snow or ice into a slush and prevent the snow or ice as it mixes with the water in the tank from adhering together to form lumps which are difficult to melt or to convert into slush so that the same can be removed.

I will now proceed to describe my invention with reference to the accompanying drawings, and will then point out the novel features in claims.

Figure 1:
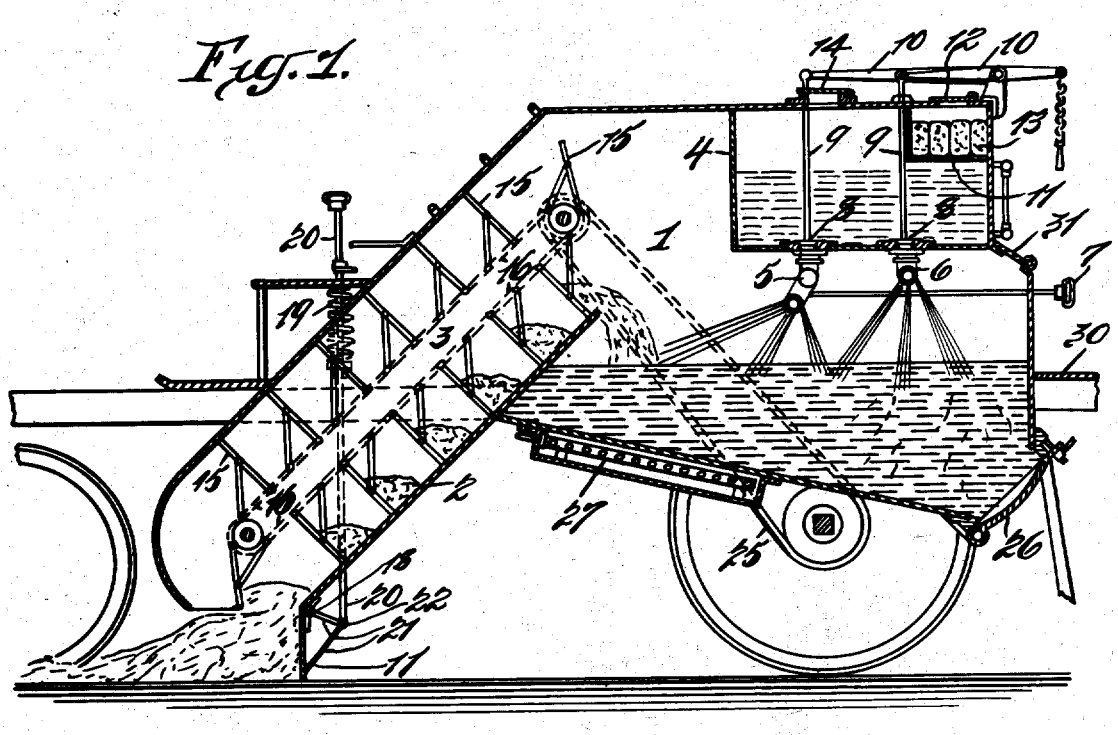
Figure 2:
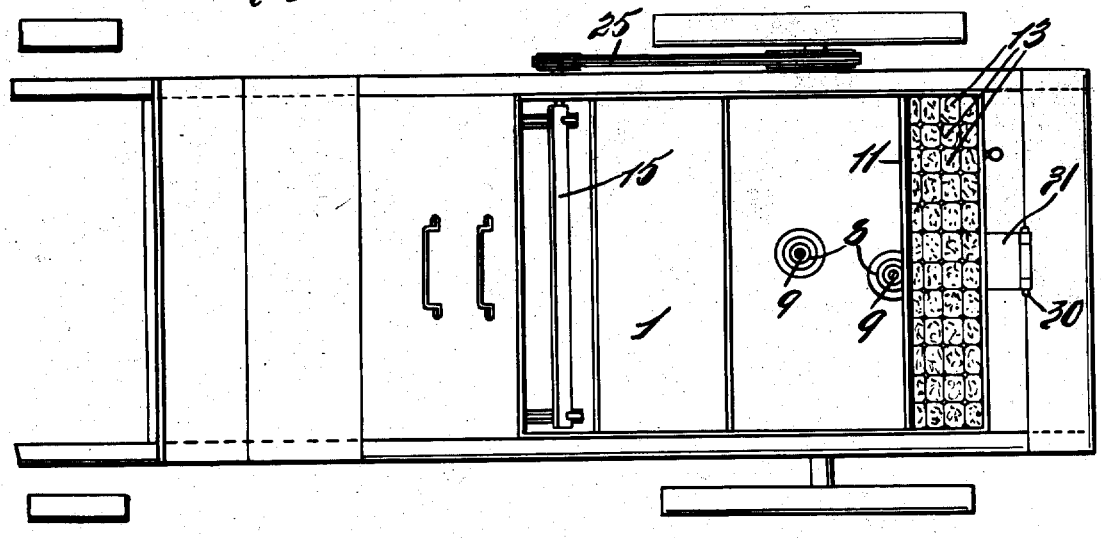

In the drawings: Figure 1 shows more or less diagrammatically a longitudinal vertical section of a machine embodying my invention. Fig. 2 shows a plan view of the machine partly in section.

In the drawings 1 designates the receiving tank and 2 a chute having within it a conveyer 3 for sweeping snow, ice or the like from the street into the chute and thence conveying same up the chute to the tank 1, which is arranged to hold a quantity of snow or ice dumped by the conveyer. From experience it has been found that it is very difficult to turn the snow into water by means of heat alone, and it is also practically impossible to convert the snow or ice into a slush by dumping the snow or ice into water; but I have found that if the snow or ice is sprayed with water which contains a small percentage of salt or analogous substance, the snow or ice sprayed with salt water will readily turn into slush and will not adhere together and form lumps as is the case when water without salt is used.

In order to supply a suitable amount of salt water to the receiving tank, a spraying tank 4 is provided, which is situated in the top of the receiving tank 1, as clearly shown in Fig. 1. The tank 4 is provided in the present instance with two outlets at the bottom which are designated 5 and 6, through which the salt solution contained in the tank 4 is sprayed into the receiving tank 1 so as to come in contact with the snow or ice, which is dumped into the receiving tank by the conveyer, and turn the same into slush. In the present instance, the outlet 5 is provided with a universal connection so that the outlet can be moved in different directions, a rod 7 being provided for controlling the movements of the same. The outlets are also provided with suitable controlling valves 8 operated through the medium of suitable levers 9 and 10 by means of which the flow of the solution through the valves can be regulated. In the present instance the upper part of the spraying tank 4 is provided with a supply box 11 which is provided with a door 12, and is adapted to hold salt or other analogous substance 13 which in the present instance is made in the form of small blocks or bricks, which permit of the same being readily removed and inserted in the tank 4 through the door 14 when it is desired to increase the strength of the liquid in the spraying tank 4.

The conveyer 3 used for delivering snow or ice to tank 1, in the present instance comprises a plurality of plates 15 secured to an endless link chain or belt 16 the same being driven by means of an endless chain or belt 25. At its lower end, the chute 3 is provided with a plow 17 adapted to scrape up snow, ice, etc., from the street so that the same can be engaged by the plates 15 of the conveyer as shown in Fig. 1. In the present instance the plow consists of a flat plate which is pivoted at its upper edge to the end of the chute 2 by means of a suitable hinge 18, the plow being held in a vertical position by means of spring 19 connected to the same through the medium of the levers 20 and 21 which are pivoted together at 22 as shown in Fig. 1. From the above it will be seen that if the plow 17 meets an obstruction such as a car track or the like the plow will be forced backward against the action of the spring 19 until the obstruction has been passed whereupon the plow will be returned to its original position.

From the above it will be seen that as the machine is moved along the street by any suitable means, the conveyer will elevate the snow or ice to the tank 1, whereupon the person operating the spraying tank will permit the salt solution to be sprayed upon the snow or ice in the receiving tank and converts the same into a slush, it being customary for the operator who stands upon the stand 30 to stir the slush from time to time by means of a suitable tool which can be inserted through the door 31. When the tank is filled with slush the door 26 at the back of the tank is opened and the slush permitted to run out, after which the door is closed and the tank again filled with snow or ice which is converted into slush as before described. If desired, the tank 1 can be heated, suitable means 27 being provided for this purpose, but ordinarily I prefer to operate the machine without the addition of heat.

While the invention has been described with particular reference to the details of construction and operation, the same is not to be considered as limited thereto, as many changes may be made and still fall within the scope of the following claims.

What I claim is:—

1. A snow removing apparatus comprising in combination a receiving tank, a chute, means in said chute for conveying snow to said tank, another tank arranged in proximity to said receiving tank, arranged to hold a salt solution, and means for delivering said solution to the receiving tank, as and for the purposes set forth.

2. A method of converting snow into slush for snow removal purposes, which consists in imparting heat to the said snow and also adding salt thereto and stirring said salt and said snow in a tank, and thereby preventing the formation of caked masses of snow.

3. The method of converting snow into slush, for snow removal purposes which consists in mixing the snow in a tank with water and salt and thereby preventing the formation of caked masses of snow without the necessity for melting more than an insignificant proportion of the snow.

4. The method of converting snow into a flowing slush for snow removal purposes, which consists in treating the snow in a tank by mixing the snow with salt and water and agitating the substances until the snow and salt and water are so intermingled as to prevent the formation of caked masses of snow but without melting more than an insignificant proportion of the snow.

5. A method of disposing of street snow, which consists in gathering up the snow, delivering it to a tank and mixing with it salt and water until the snow, without the melting of more than an insignificant proportion thereof, has been reduced to the condition of a non-caking, flowing slush, and then discharging said slush from said tank.

Signed at New York, N. Y., this 16th day of May, 1918.

SAMUEL FRIEDMAN.